(12) United States Patent
Mariller

(10) Patent No.: US 9,113,746 B2
(45) Date of Patent: Aug. 25, 2015

(54) DEVICE FOR PREPARING A DRINK EXTRACTED FROM A CAPSULE

(75) Inventor: Alain Mariller, Le Mont-Pèlerin (CH)

(73) Assignee: ETHICAL COFFEE COMPANY SA, Fribourg (CH)

( * ) Notice: Subject to any disclaimer, the term of this patent is extended or adjusted under 35 U.S.C. 154(b) by 591 days.

(21) Appl. No.: 13/386,482

(22) PCT Filed: Jul. 16, 2010

(86) PCT No.: PCT/IB2010/053256
§ 371 (c)(1),
(2), (4) Date: Apr. 6, 2012

(87) PCT Pub. No.: WO2011/010262
PCT Pub. Date: Jan. 27, 2011

(65) Prior Publication Data
US 2012/0199010 A1 Aug. 9, 2012

(30) Foreign Application Priority Data

Jul. 23, 2009 (WO) .................. PCT/IB2009/053205

(51) Int. Cl.
A47J 31/00 (2006.01)
A47J 31/36 (2006.01)
A47J 31/06 (2006.01)

(52) U.S. Cl.
CPC .......... *A47J 31/3695* (2013.01); *A47J 31/0668* (2013.01); *A47J 31/3623* (2013.01); *A47J 31/3628* (2013.01)

(58) Field of Classification Search
CPC .............. A47J 31/3623; A47J 31/3628; A47J 31/3633; A47J 31/3695; A47J 31/3676
USPC ............................ 99/295, 289 R, 302 R, 323
See application file for complete search history.

(56) References Cited

U.S. PATENT DOCUMENTS

| 1,090,900 A | 3/1914 | Barrett |
| 2,778,739 A | 1/1957 | Rodth |
| 2,899,886 A | 8/1959 | Rodth |
| 3,094,892 A | 6/1963 | Topf |
| 3,199,398 A | 8/1965 | Weisz |

(Continued)

FOREIGN PATENT DOCUMENTS

| EP | 0 710 462 | 4/1998 |
| EP | 1 203 554 A1 | 5/2002 |

(Continued)

OTHER PUBLICATIONS

English Translation of International Preliminary Report on Patentability (IPRP) for PCT/IB2010/053256, dated Jul. 16, 2010.

(Continued)

*Primary Examiner* — Reginald L Alexander
(74) *Attorney, Agent, or Firm* — Nixon & Vanderhye P.C.

(57) ABSTRACT

The invention relates to a device for preparing a drink extracted from a capsule, including a capsule mounting and a capsule housing, inside of which at least one water inlet and a capsule-boring means are arranged, characterized in that said housing is sized so as to at least partially deform any capsule, consisting of a material that is deformable when placed in contact with hot water and placed in the housing, such that the capsule is retained in the housing after the contact thereof with the hot water.

4 Claims, 5 Drawing Sheets

(56) References Cited

U.S. PATENT DOCUMENTS

| | | | |
|---|---|---|---|
| 3,236,145 | A | 2/1966 | Schenkel |
| 3,323,404 | A | 6/1967 | Fischer |
| 6,499,388 | B2 | 12/2002 | Schmed |
| 7,946,217 | B2 * | 5/2011 | Favre et al. .................... 99/295 |
| 8,047,126 | B2 * | 11/2011 | Doglioni Majer .............. 99/295 |
| 8,336,447 | B2 * | 12/2012 | Jarisch et al. ............... 99/289 R |
| 2003/0056661 | A1 | 3/2003 | Hu et al. |
| 2003/0217644 | A1 | 11/2003 | Jarisch et al. |
| 2009/0130270 | A1 * | 5/2009 | Cortese ......................... 426/281 |
| 2012/0031279 | A1 | 2/2012 | Mariller et al. |
| 2012/0276255 | A1 * | 11/2012 | Verbeek ........................ 426/112 |

FOREIGN PATENT DOCUMENTS

| | | |
|---|---|---|
| EP | 1 295 554 | 3/2003 |
| EP | 1 500 357 | 1/2005 |
| EP | 1 859 712 A1 | 11/2007 |
| FR | 1240813 | 8/1960 |
| FR | 1300817 | 7/1962 |
| FR | 1562417 | 4/1969 |
| GB | 1182227 | 2/1970 |
| JP | 3-58231 | 6/1991 |
| WO | WO 02/00073 A1 | 1/2002 |
| WO | WO 2007/122208 A1 | 11/2007 |
| WO | WO 2009/090201 | 7/2009 |
| WO | WO 2009/090201 A1 | 7/2009 |
| WO | WO 2009/115474 A1 | 9/2009 |
| WO | WO 2010/092543 A2 | 8/2010 |

OTHER PUBLICATIONS

International Search Report for PCT/IB2010/053256, mailed Nov. 5, 2010.

Written Opinion of the International Searching Authority for PCT/IB2010/053256, mailed Nov. 5, 2010.

Japanese Office Action dated May 13, 2014 issued in Japanese Patent Application No. 2012-521136 and English translation, 6 pp.

International Patent Application No. PCT/IB2009/050564 (Mariller et al.) filed Feb. 11, 2009.

"Harpon" Wikipedia Article—WayBack Machine, 2007 (2 pages) (retrieved from http://wayback.archive.org/web/20070422062956/http://fr.wikipedia.org/wikipedia.org/wiki/Harpon, Apr. 29, 2014).

J.Y.H. Fuh, et al., "Computer-Aided Injection Mold Design and Manufacture", Marcel Dekker, Inc., 2004 (23 pages).

Tool and Manufacturing Engineers Handbook, vol. 8, Plastic Part Manufacturing, Society of Manufacturing Engineers (SME), Ed. Philip Mitchell, 1996 (30 pages).

Klein, Peter, "Fundamentals of Plastics Thermoforming", Synthesis Lectures on Materials Engineering, Morgan & Claypool Publishers, 2009 (12 pages, including pp. 45-49).

Amazon.com product and publication information for "Fundamentals of Plastics Thermoforming" (Synthesis Lectures on Materials Engineering) by Peter Klein, published May 12, 2009 (3 pages) (retrieved from http://www.amazon.com/Fundamentals-Thermaforming-Synthesis-Materials-Engineering/dp/1598298844 Apr. 11, 2014).

Michel Chatain and Alexandre Dobraczynski, "Injection des thermoplastiques: les moules", Ref. No. A3680a, in Techniques de l'Ingénieur, Plastiques et composites, Jan. 1997 (8 pages).

Michel Chatain and Alexandre Dobraczynski, "Injection des thermoplastiques: les moules", Ref. No. A3682, in Techniques de l'Ingénieur, Plastiques et composites, Jan. 1997 (14 pages).

"Undercuts" from Arrem Plastics: Design Guide—WayBack Machine 2009 (2 pages) (retrieved from http://web.archive.org/web/20090712162104/http://www.marketingtech.com/designguide/dgundercuts.htm, Apr. 29, 2014).

Assignation Devant Le Tribunal de Grande Instance de Paris re Ethical Coffee Company SA and Nespresso France et al., Apr. 8, 2011 (18 pages).

Vegeplast fabriquera les dosettes de café concurrentes de Nespresso retrieved Apr. 15, 2014 from http://www.objectifnews.com/node/1430 (2 pages).

Form—Opposition à un brevet européen re European Patent No. EP 2312978 entitled "Dispositif Pour La Preparation D'Une Boisson Extraite A Partir D'Une Capsule" by Nestec S.A. and Nespresso France dated Aug. 1, 2013 (6 pages).

Opposition Brief of Nestec S.A. and Nespresso France re EP 2312978 B1, dated Aug. 1, 2013 (25 pages).

Opposition Brief of Nestec S.A. and Nespresso France re EP 2312978 B1, dated Apr. 30, 2014 (50 pages).

* cited by examiner

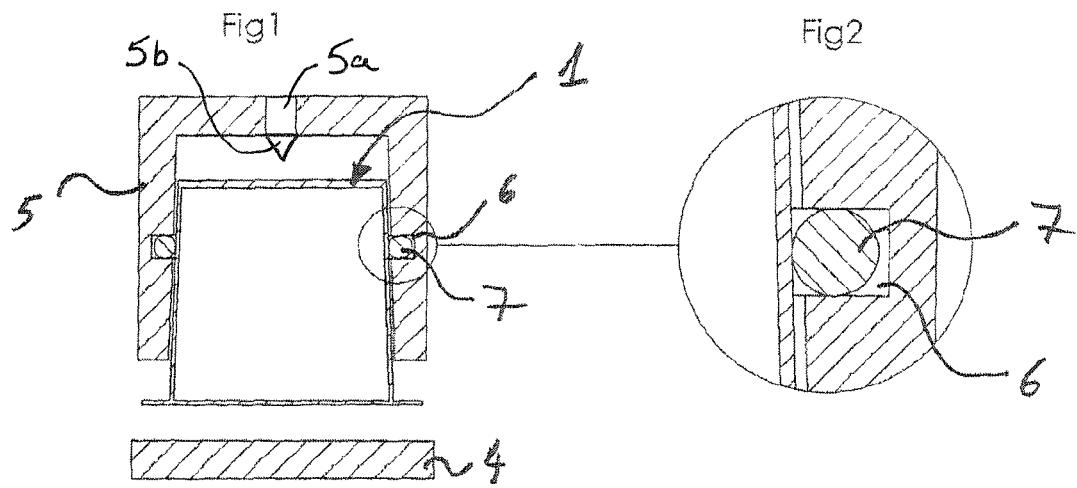
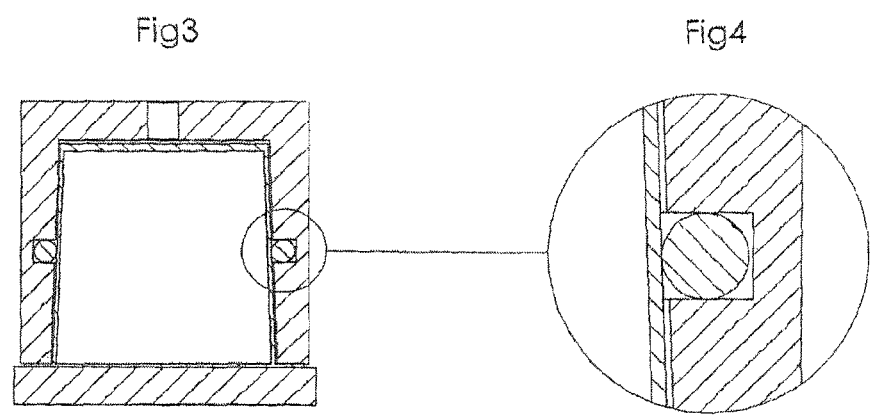
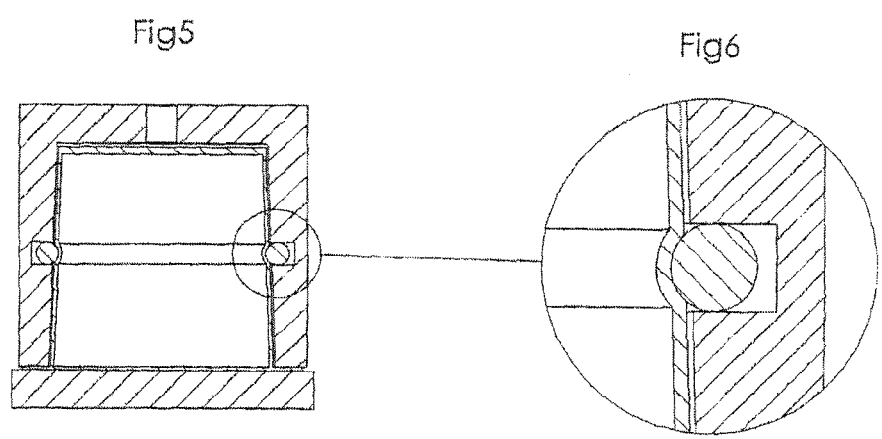

Fig7
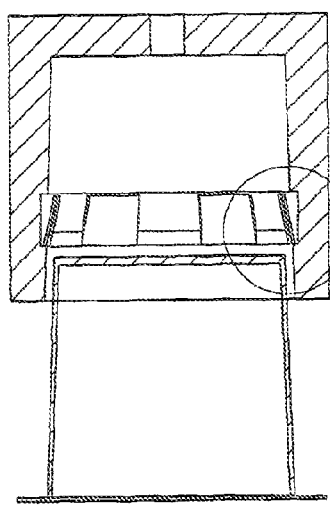
Fig8
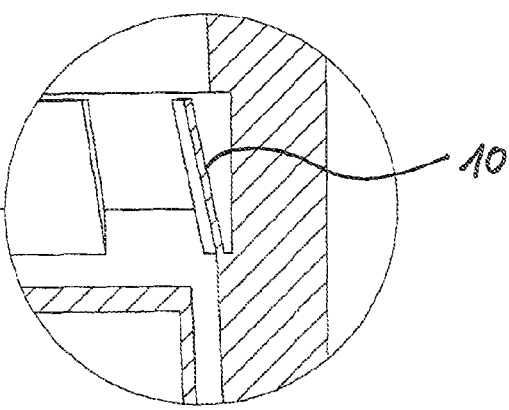
Fig9
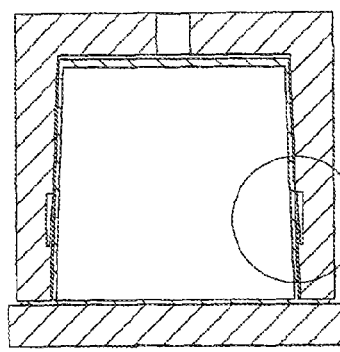
Fig10
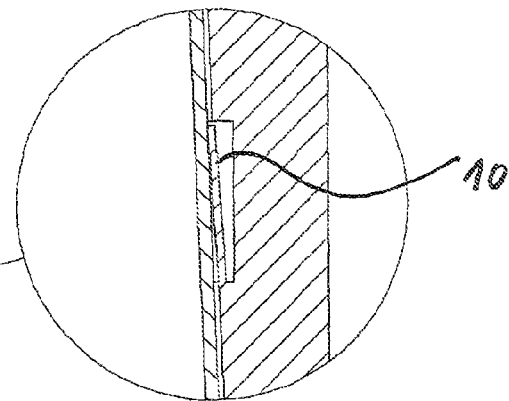
Fig11
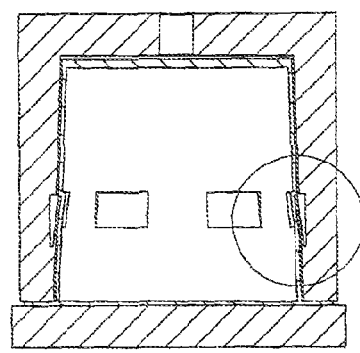
Fig12
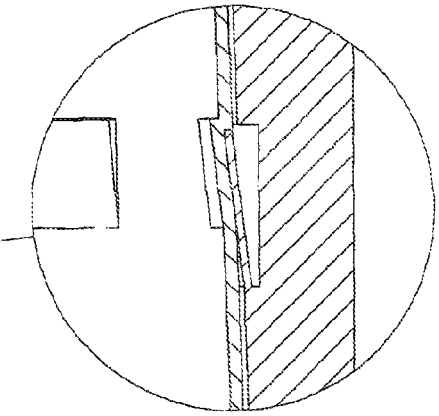
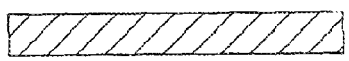

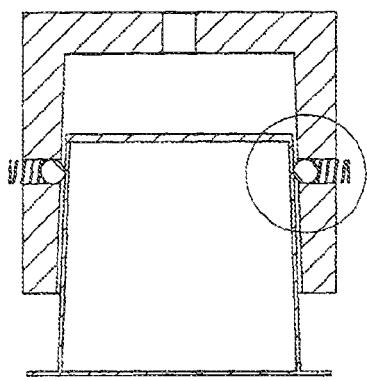
Fig 13
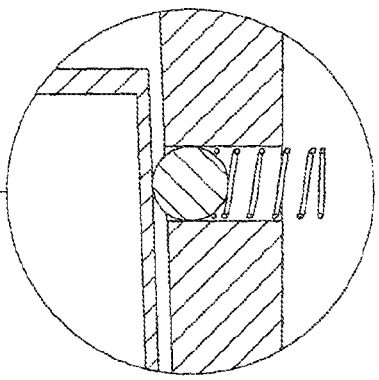
Fig 14
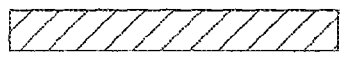
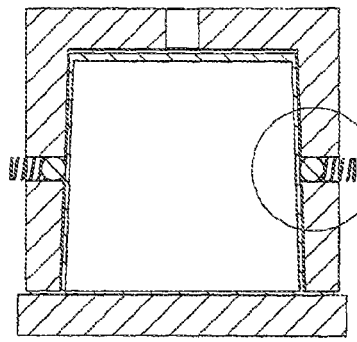
Fig 15
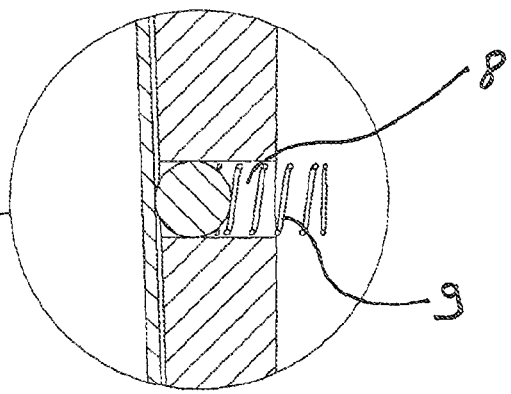
Fig 16
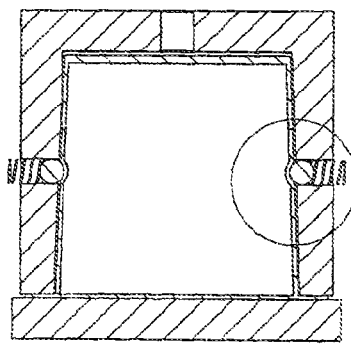
Fig 17
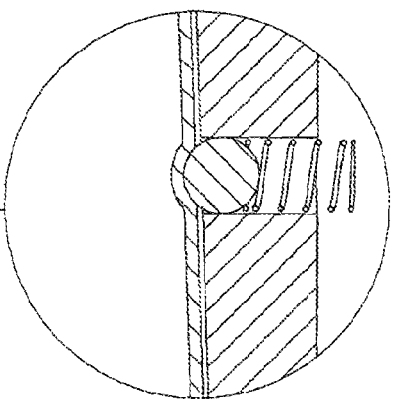
Fig 18

DEVICE FOR PREPARING A DRINK EXTRACTED FROM A CAPSULE

This application is the U.S. national phase of International Application No. PCT/IB2010/053256, filed 16 Jul. 2010, which designated the U.S. and claims priority to IB Application No. PCT/IB2009/053205 filed 23 Jul. 2009, the entire contents of each of which are hereby incorporated by reference.

FIELD OF THE INVENTION

The present invention falls within the field of the preparation of drinks or beverages, e.g. those based on coffee, by extracting a concentrated dose, e.g. of ground coffee, contained in a capsule. It relates more specifically to the devices that use such capsules.

PRIOR ART

Capsules and machines that operate on the aforementioned principle have been in existence for several decades.

Patents U.S. Pat. Nos. 2,899,886 , 2,968,560, 3,403,617 and 3,607,297 describe devices in which the capsule is initially pierced at several points, then has pressurized water passed through it.

The capsule described in patent CH 605 293 or in patent EP 0 242 556 B1 comprises a membrane in its lower part. Water under pressure is initially introduced into the upper part of the capsule, causing the capsule to swell, mainly in the region of the membrane. Beyond a certain pressure, the membrane tears thereby allowing a water-coffee mixture to flow out.

Other capsules equipped with membranes are described in the following patent documents: EP 0 468 079 A, EP 0 806 373 A, EP 0 554 469 A.

SUMMARY OF THE INVENTION

The present invention seeks to avoid the use of capsules made of a material that can be deformed on contact with hot water. This is because that type of material can cause malfunctioning in certain devices.

The subject of the invention is therefore a device for preparing a drink extracted from a capsule comprising a capsule support and a capsule cage inside which there are at least a water inlet and capsule-piercing means, characterized in that said cage is sized in such a way as to deform, at least partially, any capsule, made of a material that can be deformed upon contact with hot water, which is placed in the cage, so that the capsule is retained in the cage following its contact with hot water.

According to a first embodiment of the invention, the internal wall of the cage comprises a recess in which is housed a deformable element the coefficient of rigidity of which is greater than the coefficient of rigidity of the material of which the capsule is made.

The recess may have the form of an annular groove or of one or several holes.

According to another embodiment of the invention, the internal wall of the cage comprises pivoting elements of the vane type which are designed to be completely housed in the wall of the cage if the coefficient of rigidity of the capsule exceeds a set value and, if not, to emerge at least partially from said wall.

According to another embodiment of the invention, the internal wall of the cage comprises a relief of the barbed hook type.

Finally, the internal wall of the cage may be in the form of a bell and has an internal volume greater than the volume of the capsules.

BRIEF DESCRIPTION OF THE DRAWINGS

The invention is described in greater detail hereinafter via some nonlimiting embodiments illustrated by the following figures:

FIGS. 1 to 6 show one example of a device which embodies the invention;

FIGS. 7-12 show another example of a device which embodies the invention;

FIGS. 13-18 show another example of a device which embodies the invention;

DETAILED DESCRIPTION OF THE INVENTION

Figure 19:
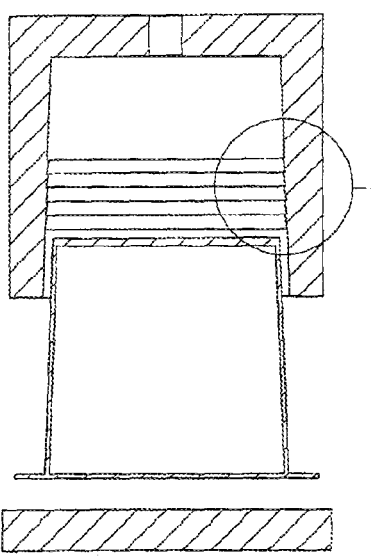
FIGS. 19-24 show another example of a device which embodies the invention.

The invention is described in greater detail hereinafter via some nonlimiting embodiments illustrated by the following figures:

FIGS. 1 to 6 show one example of a device according to the invention in which the internal wall of the cage 5 comprises a recess 6 in the form of an annular groove, the inside of the recess 6 being occupied by a slightly deformable element 7, e.g. an O-ring or a spring which, by allowing itself to be compressed a little, allows a rigid capsule to be inserted into the cage 5, without the capsule 1 becoming deformed. If the capsule 1 softens as a result of its coming into contact with hot water (see FIGS. 5 and 6), the side wall of the capsule 1 is deformed in the region of the recess 6. Once the hot water has been removed, the capsule 1 stiffens and remains jammed in the cage 5, thereby rendering the device inoperative.

It should be noted that the slightly deformable element 7 has to be adapted so that it applies a certain force toward the center of the cage 5. The cage 5 is also provided with a water inlet 5a and a piercing device 5b.

The alternative form illustrated in FIGS. 13 to 18 works in a similar way to the one illustrated in FIGS. 1 to 6. It differs only in that the recess is in the form of at least one cylindrical hole 8 in which a spring 9 is placed. For preference, use is made of several holes 8 distributed around the capsule 1.

The alternative form shown in FIGS. 7 to 12 also has a cage 5 with one or more recesses. However, in this case, the deforming element has the form of a vane 10 that pivots about a horizontal axis. When the capsule 1 is inserted into the cage, the vane 10 is completely housed in its recess. Once the capsule 1 is softened, each vane 10 digs into the wall of the capsule 1. The geometry of the vanes 10 has the effect of acting like a barbed hook. As can be seen in FIGS. 11 and 12, the capsule 1 is retained in the cage 5.

Figure 20:
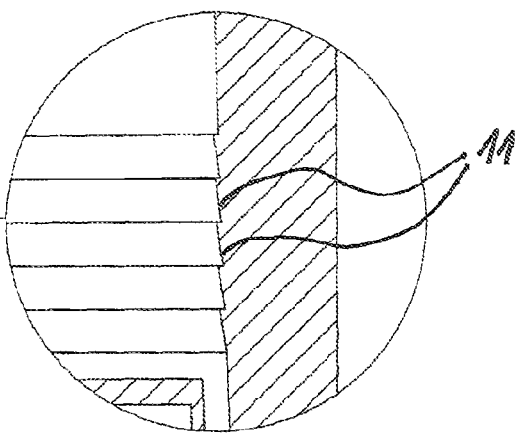
Figure 21:
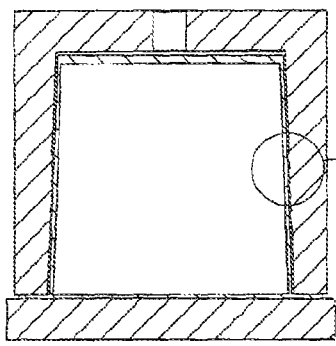
Figure 22:
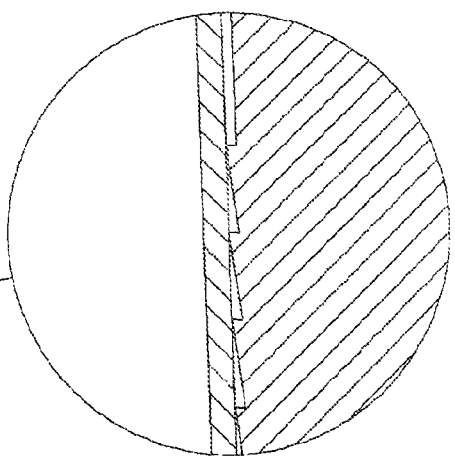
Figure 23:
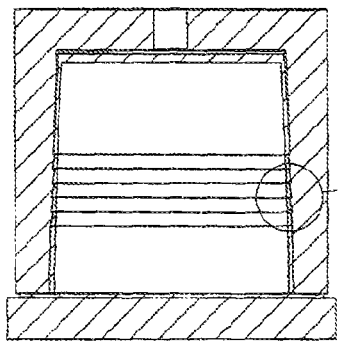
Figure 24:
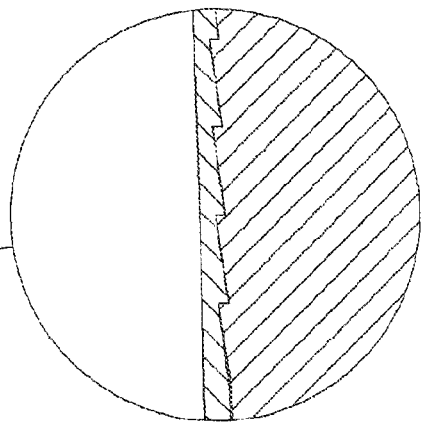

The alternative form in FIGS. 19 to 24 is characterized by an internal cage 5 wall which comprises a toothed relief in the form of a barbed hook 7. When the capsule 1 softens, part of its material becomes lodged between the teeth of the cage 5, thereby retaining the capsule 1 in the cage 5.

Figure 25:
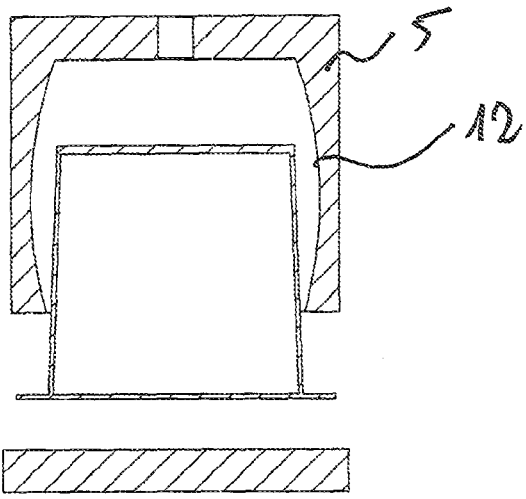
FIGS. 25-28 show another example of a device which embodies the invention.
Figure 26:
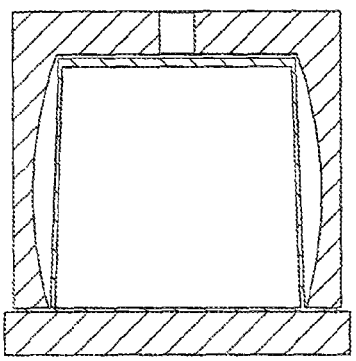
Figure 27:
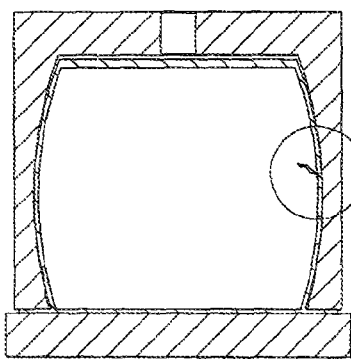
Figure 28:
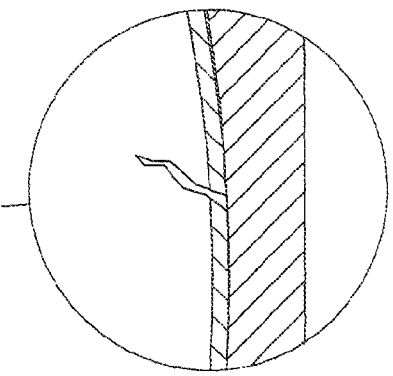

Finally, the alternative form in FIGS. 25 to 28 shows a cage 5 in the form of a bell the internal volume of which is greater than that of the capsules. When hot water enters a capsule that can be deformed upon contact therewith, the deformation is such that its side wall may burst (see FIGS. 27 and 28). The capsule cannot therefore be used.

Further, once the hot water has been removed, the capsule 1 is jammed in the cage 5.

It goes without saying that the invention is not restricted to the examples illustrated in the figures.

The invention claimed is:

1. A device for preparing a drink extracted from a capsule comprising:
    a capsule support,
    a capsule cage, and
    at least a water inlet and capsule-piercing device inside the capsule cage, wherein
    the capsule cage is sized in such a way as to at least partially deform any capsule made of a material that can be deformed upon contact with hot water which is placed in the capsule cage so that the capsule is retained in the capsule cage following its contact with hot water, and wherein
    the capsule cage includes an internal wall having several recesses in the form of holes, and several deformable elements each housed within a respective one of the holes, wherein
    the deformable elements have a coefficient of rigidity which is greater than a coefficient of rigidity of the material from which the capsule is made.

2. A device for preparing a drink extracted from a capsule comprising:
    a capsule support,
    a capsule cage, and
    at least a water inlet and capsule-piercing device inside the capsule cage, wherein
    the capsule cage is sized in such a way as to at least partially deform any capsule made of a material that can be deformed upon contact with hot water which is placed in the capsule cage so that the capsule is retained in the capsule cage following its contact with hot water, and wherein
    the capsule cage comprises an internal wall and pivoting elements formed on the internal wall, wherein
    the pivoting elements are completely housed in the internal wall of the cage if the capsule exhibits a coefficient of rigidity which exceeds a set value but emerge at least partially from the internal wall of the capsule cage when the coefficient of rigidity of the capsule is less than the set value.

3. A device for preparing a drink extracted from a capsule comprising:
    a capsule support,
    a capsule cage, and
    at least a water inlet and capsule-piercing device inside the capsule cage, wherein
    the capsule cage is sized in such a way as to at least partially deform any capsule made of a material that can be deformed upon contact with hot water which is placed in the capsule cage so that the capsule is retained in the capsule cage following its contact with hot water, and wherein
    the capsule cage has an internal wall which includes a barbed hook relief.

4. A device for preparing a drink extracted from a capsule comprising:
    a capsule support,
    a capsule cage, and
    at least a water inlet and capsule-piercing device inside the capsule cage, wherein
    the capsule cage is sized in such a way as to at least partially deform any capsule made of a material that can be deformed upon contact with hot water which is placed in the capsule cage so that the capsule is retained in the capsule cage following its contact with hot water, and wherein
    the capsule cage includes a bell-shaped internal wall having an internal volume greater than a volume of the capsules.

* * * * *